US012731906B2

(12) United States Patent
Eguchi

(10) Patent No.: US 12,731,906 B2
(45) Date of Patent: Sep. 8, 2026

(54) COMMUNICATION APPARATUS AND WIRELESS COMMUNICATION SYSTEM

(71) Applicant: CANON KABUSHIKI KAISHA, Tokyo (JP)

(72) Inventor: Tadashi Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 167 days.

(21) Appl. No.: 18/659,928

(22) Filed: May 9, 2024

(65) Prior Publication Data

US 2024/0380116 A1 Nov. 14, 2024

(30) Foreign Application Priority Data

May 12, 2023 (JP) ................................. 2023-079712

(51) Int. Cl.

| | |
|---|---|
| ***H01Q 13/08*** | (2006.01) |
| ***H01Q 1/36*** | (2006.01) |
| ***H01Q 13/20*** | (2006.01) |
| ***H04B 3/50*** | (2006.01) |

(52) U.S. Cl.

CPC ............. *H01Q 13/206* (2013.01); *H01Q 1/36* (2013.01)

(58) Field of Classification Search

CPC ............ H01Q 1/36; H01Q 9/28; H01Q 13/08; H01Q 13/206; H04B 1/18; H04B 3/50

See application file for complete search history.

(56) References Cited

U.S. PATENT DOCUMENTS

| | | | | |
|---|---|---|---|---|
| 2019/0245575 A1* | 8/2019 | Yukimasa | ................ | H04B 5/22 |
| 2021/0409013 A1* | 12/2021 | Eguchi | .................... | H01P 1/061 |
| 2023/0223991 A1* | 7/2023 | Tomabechi | .............. | H04B 5/24 455/41.1 |
| 2023/0291423 A1* | 9/2023 | Tomabechi | ............. | H01P 3/026 |

FOREIGN PATENT DOCUMENTS

JP 2020048068 A * 3/2020

* cited by examiner

*Primary Examiner* — Thai Pham

(74) *Attorney, Agent, or Firm* — Canon U.S.A., Inc., IP Division

(57) ABSTRACT

A communication apparatus that communicates with another communication apparatus through electromagnetic field coupling includes a first conductor configured to transmit or receive a signal through the electromagnetic field coupling, a metal member configured to function as a ground of the first conductor, a second conductor connected to the first conductor; and an electrode having one side connected to the second conductor and another side to be supplied with the signal or connected to a termination resistor.

12 Claims, 16 Drawing Sheets

COMMUNICATION APPARATUS AND WIRELESS COMMUNICATION SYSTEM

BACKGROUND

Field of the Disclosure

The present disclosure relates to a communication apparatus that wirelessly transmits a signal and a wireless communication system.

Description of the Related Art

Short range wireless communication systems have been researched and developed in which nearby devices wirelessly communicate with each other using electromagnetic field coupling. According to Japanese Patent Application Laid-Open No. 2020-48068, a configuration is discussed in which differential signal lines 101 are formed on a flexible printed circuit 107 and a metal member 106 functions as a ground as illustrated in FIG. 12 (prior art) to form a transmission line so that efficient communication is established between the transmission line and a transmission line that is electromagnetically coupled thereto.

SUMMARY

According to an aspect of the present disclosure, a communication apparatus that communicates with another communication apparatus through electromagnetic field coupling includes a first conductor configured to transmit or receive a signal through the electromagnetic field coupling, a metal member configured to function as a ground of the first conductor, a second conductor connected to the first conductor; and an electrode having one side connected to the second conductor and another side to be supplied with the signal or connected to a termination resistor.

Further features of the present disclosure will become apparent from the following description of exemplary embodiments with reference to the attached drawings.

DESCRIPTION OF THE EMBODIMENTS

<Issue in Power Supply Portion/Termination Portion of Transmission Line>

Figure 12:
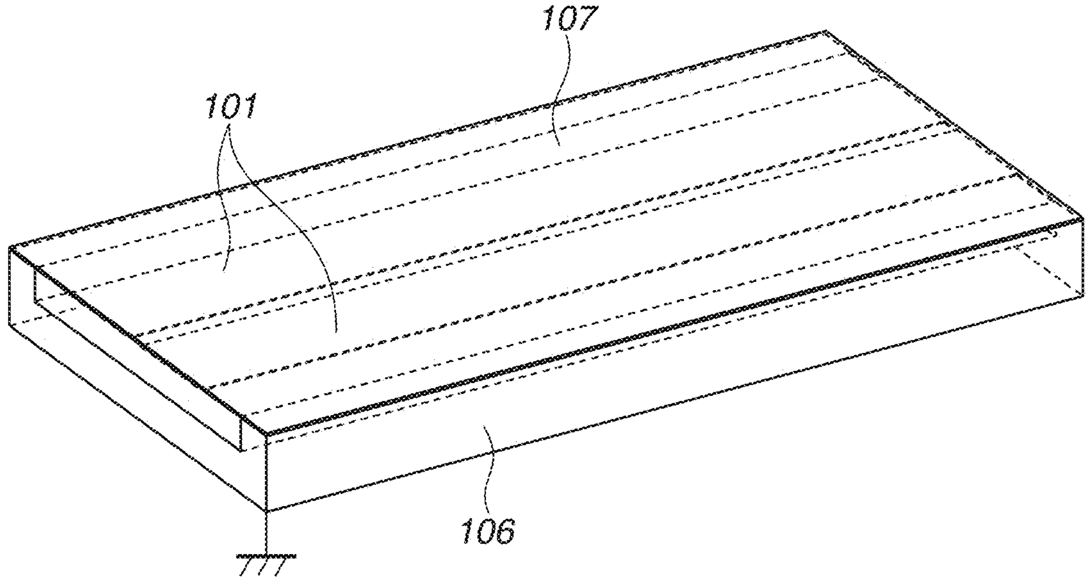
FIG.12 PRIOR ART
FIG. 12 illustrates a transmission line with a flexible printed circuit in the prior art.

An issue in the transmission line in prior art seen in FIG. 12 is further described before describing exemplary embodiments according to the present disclosure.

As illustrated in FIG. 12, the differential signal lines 101 that transmit signals are disposed on the flexible printed circuit 107. A metal surface of the metal member 106 that is substantially parallel to the flexible printed circuit 107 serves as a ground surface, which forms the transmission line. In such a configuration, there is an air layer between the ground surface and the differential signal lines 101 that transmit signals. Since air has a relative permittivity of 1 and has no dielectric loss, it is possible to configure a transmission line with little loss even if the line is lengthened. However, the differential signal lines 101 and the ground surface are arranged on separate positions, so that it is difficult to implement a coaxial connector and a coaxial cable which are commonly used.

Descriptions will be provided below while presenting simulation results.

Figure 13:
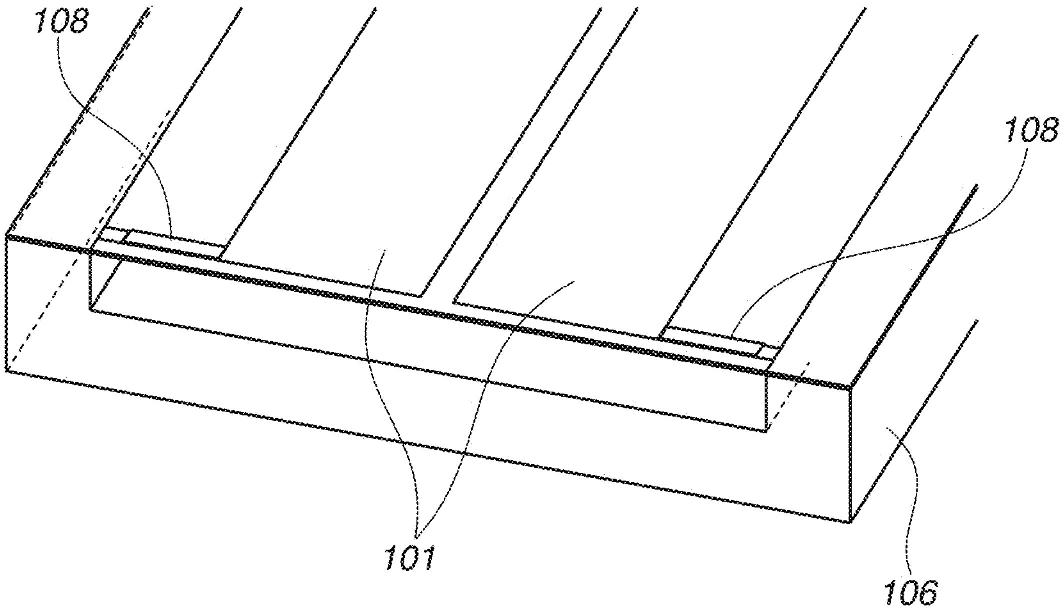
FIG. 13 illustrates a method for supplying power to or terminating the transmission line with the flexible printed circuit.
Figure 14:
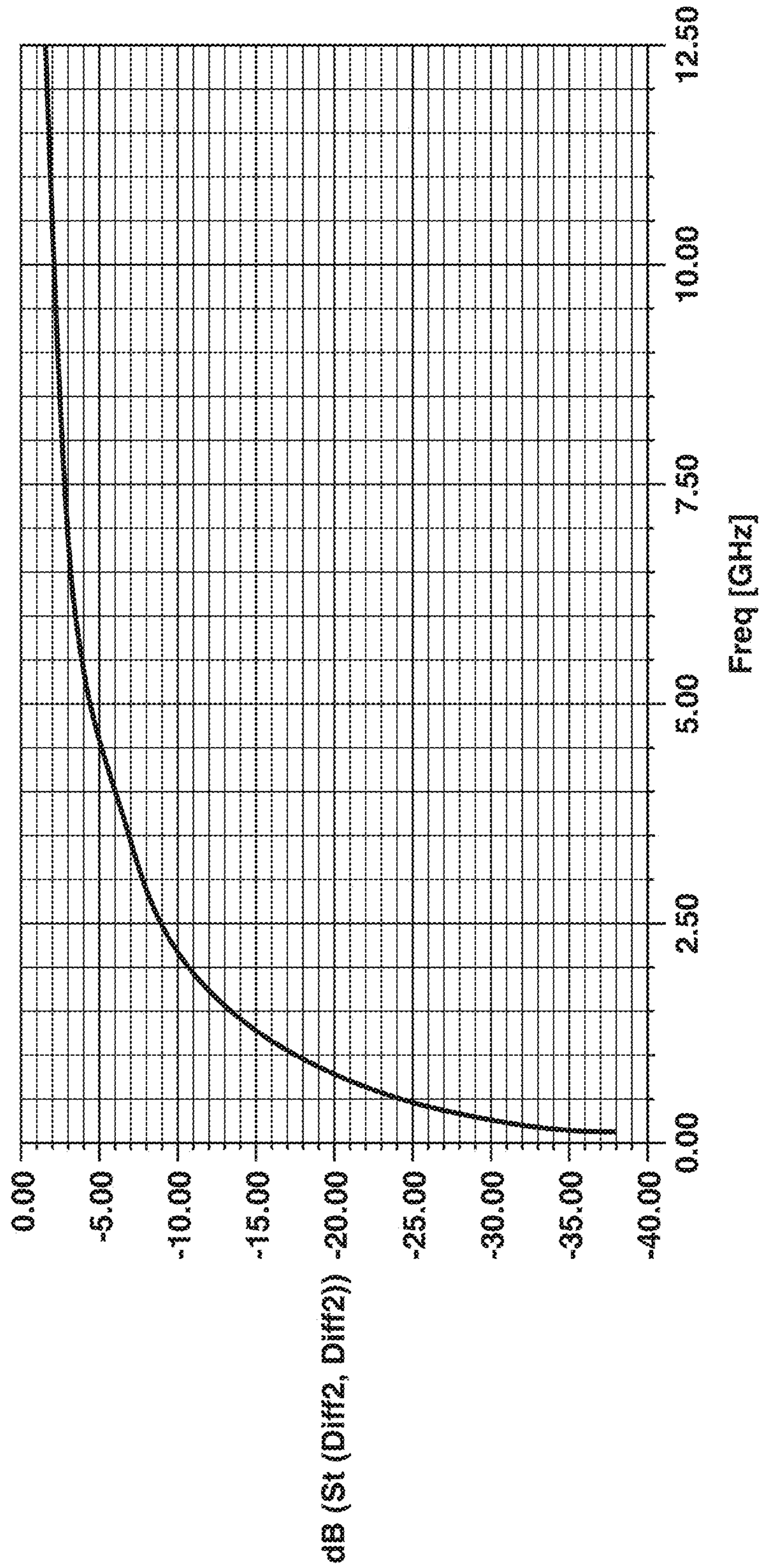
FIG. 14 is a graph illustrating a reflection characteristic in the method for supplying power or terminating in FIG. 13.

FIG. 13 illustrates a simulation model with traces of wiring 108 in the transmission line. The traces of wiring 108 extends from the differential signal lines 101 toward the metal member 106 to which the flexible printed circuit is fixed. The transmission line includes the differential signal lines 101 formed on the flexible printed circuit and the metal member 106 that fixes the flexible printed circuit and serves as the ground surface. FIG. 14 is a graph illustrating a reflection characteristic at a termination portion in FIG. 13.

Figure 15:
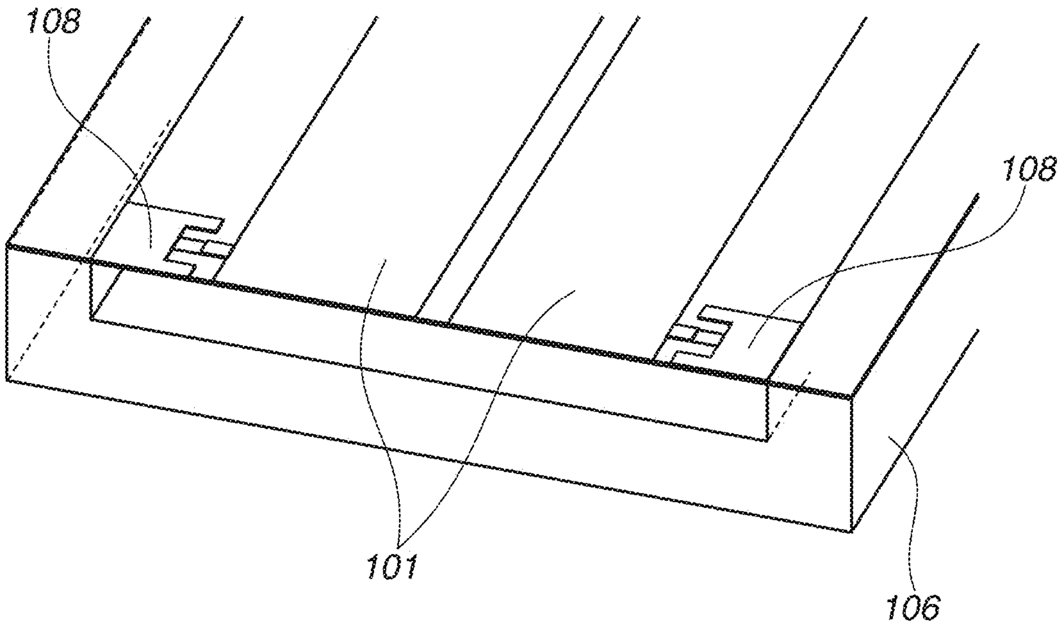
FIG. 15 illustrates another method for supplying power to or terminating the transmission line with the flexible printed circuit.
Figure 16:
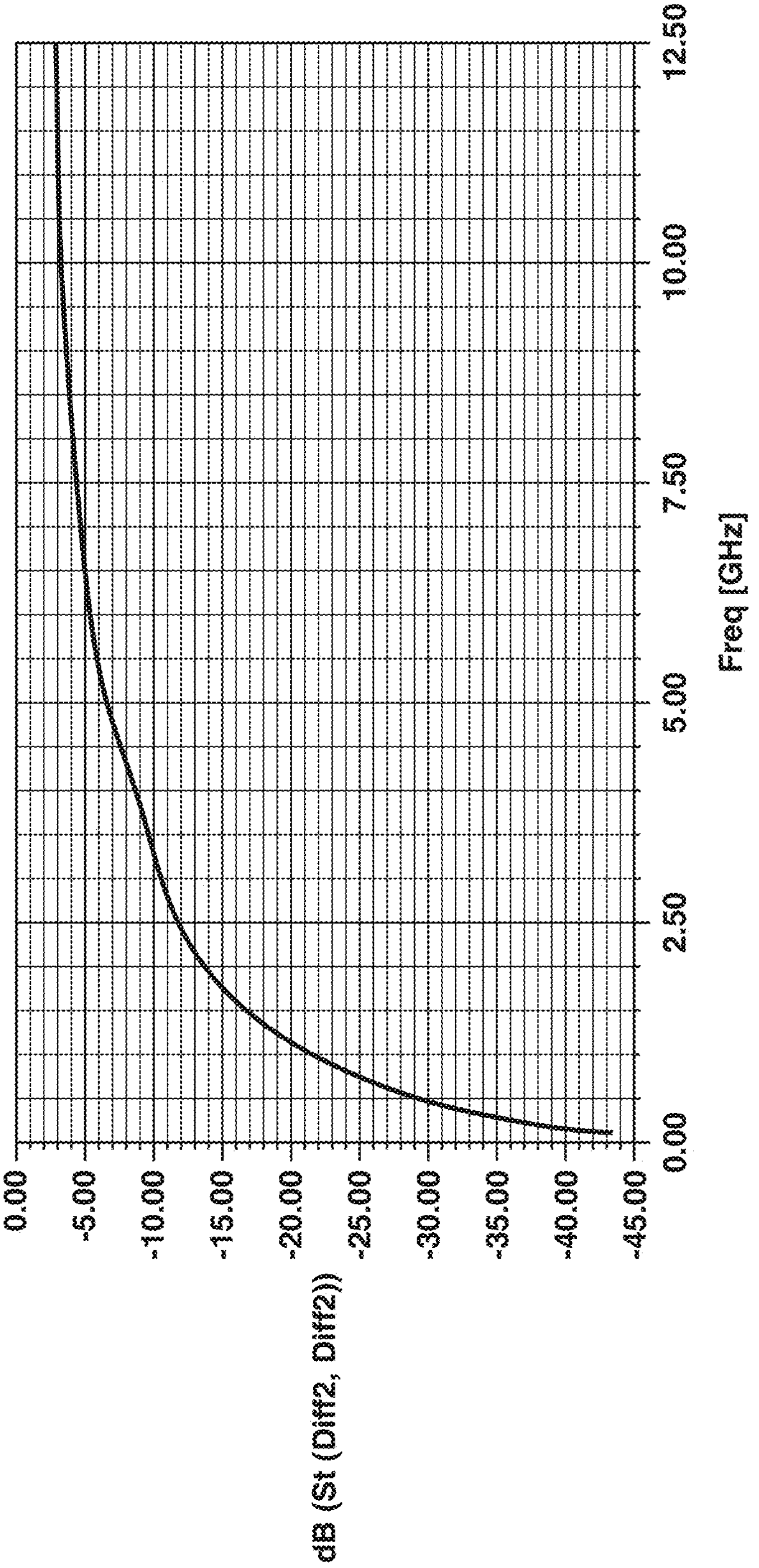
FIG. 16 is a graph illustrating a reflection characteristic in the method for supplying power or terminating in FIG. 15.

In FIG. 14, if a frequency exceeds 2.2 GHz, reflection is-10 dB or more. Thus, it is found that large reflection results in the occurrence of an impedance mismatch at the termination portion. FIG. 15 illustrates a model in a case where a termination portion of a transmission line similar to that in FIG. 13 is connected to a pattern for a small surface-mounting coaxial connector. FIG. 16 illustrates a reflection characteristic of the model in FIG. 15. In FIG. 16, the reflection characteristic is slightly improved as compared with FIG. 14, but the frequency of 3.2 GHz or more and the reflection of −10 dB or more induce the occurrence of an impedance mismatch.

In general, if the reflection characteristic is −10 dB or less up to a frequency twice a fundamental frequency of a signal to be transmitted, a signal distortion is small and an error is less likely to occur. According to the present exemplary embodiment, a description will be provided below using a signal of 10 Gbps as an example. Thus, it is desirable that the reflection is −10 dB or less up to a frequency of 10 GHz.

EXEMPLARY EMBODIMENTS

Figure 1A:
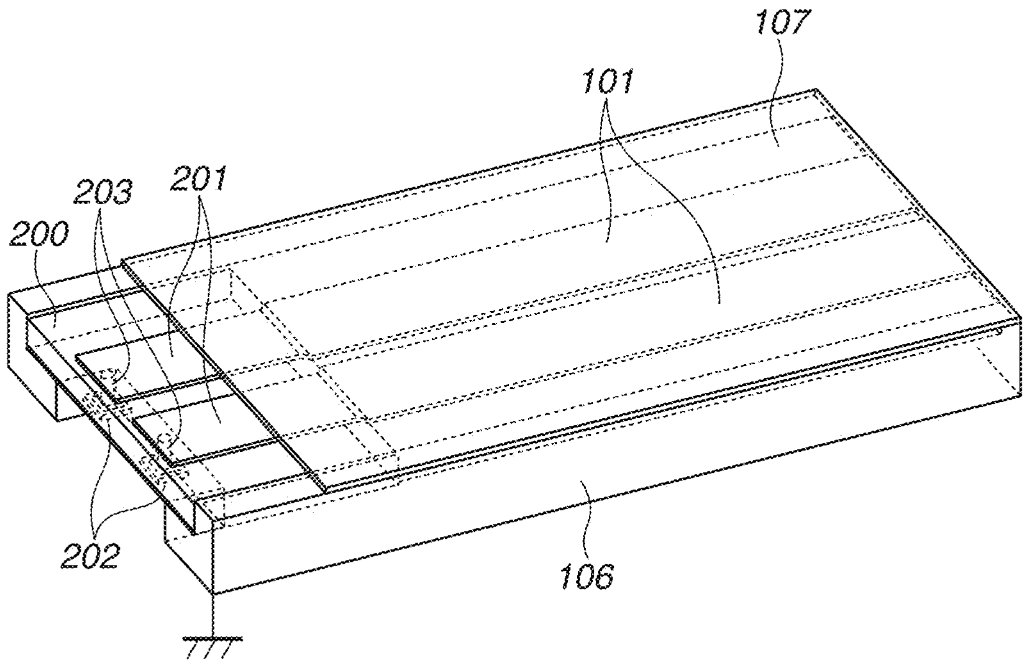
FIGS. 1A and 1B are configuration diagrams illustrating a transmission line according to an exemplary embodiment of the present disclosure.
Figure 1B:
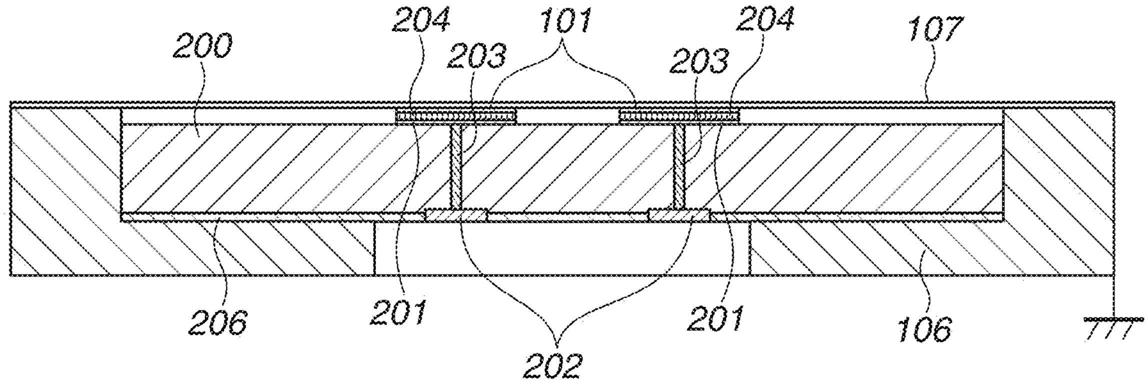

As a configuration for solving the above-described issue, FIGS. 1A and 1B are a configuration diagram and a sectional view of a transmission line according to the present exemplary embodiment, respectively. The transmission line is configured with differential signal lines 101 formed on a flexible printed circuit 107 and a metal member 106 that fixes the flexible printed circuit 107 and serves as a reference potential for the differential signal lines 101.

A groove is formed in the metal member 106 directly below the differential signal lines 101, and a depth of the groove is adjusted so that a transmission line width and a portion between the differential signal lines 101 have desired impedance. In this way, the differential signal lines 101 and the ground of the metal member 106 form a differential microstrip line. An electric substrate 200 (hereinbelow, also referred to as the substrate 200) supplies power to or terminates the transmission line, which is formed by the differential signal lines 101 on the above-described flexible printed circuit 107 and the metal member 106 according to the present exemplary embodiment.

In the substrate 200, differential signal lines 201 are formed with flat conductors that are connected to the differential signal lines 101 on the flexible printed circuit 107 by soldering or the like. An extraction electrode 202 is connected to a differential signal line 201 via a via 203. The substrate 200 is inserted between the flexible printed circuit 107 and the metal member 106 at a power supply portion or a termination portion of the flexible printed circuit 107. The metal member 106 has a notch so that a contact with the extraction electrode 202 of the substrate 200 is prevented.

In FIG. 1B, solder 204 connects the differential signal lines 101 on the flexible printed circuit 107 and the differential signal lines 201 on the substrate 200. A ground conductor 206 is a metal for ground that acts as a reference potential for the differential signal lines 201, and comes into contact and is conducted with the metal member 106 at a time of fixing the substrate 200. Accordingly, the metal member 106 and the ground conductor 206 have approximately the same potential. The ground conductor 206 of the substrate 200 and the metal member 106 may be conducted with each other using a conductive adhesive or the like, and any conduction method with which the ground conductor 206 acts as the reference potential is applicable. A method for fixing the flexible printed circuit 107 and the substrate 200 is not particularly limited, such as by screwing or bonding with an adhesive. The above-described flexible printed circuit 107 is shorter than the above-described substrate 200, but may cover the entire electric substrate 200.

Figure 2:
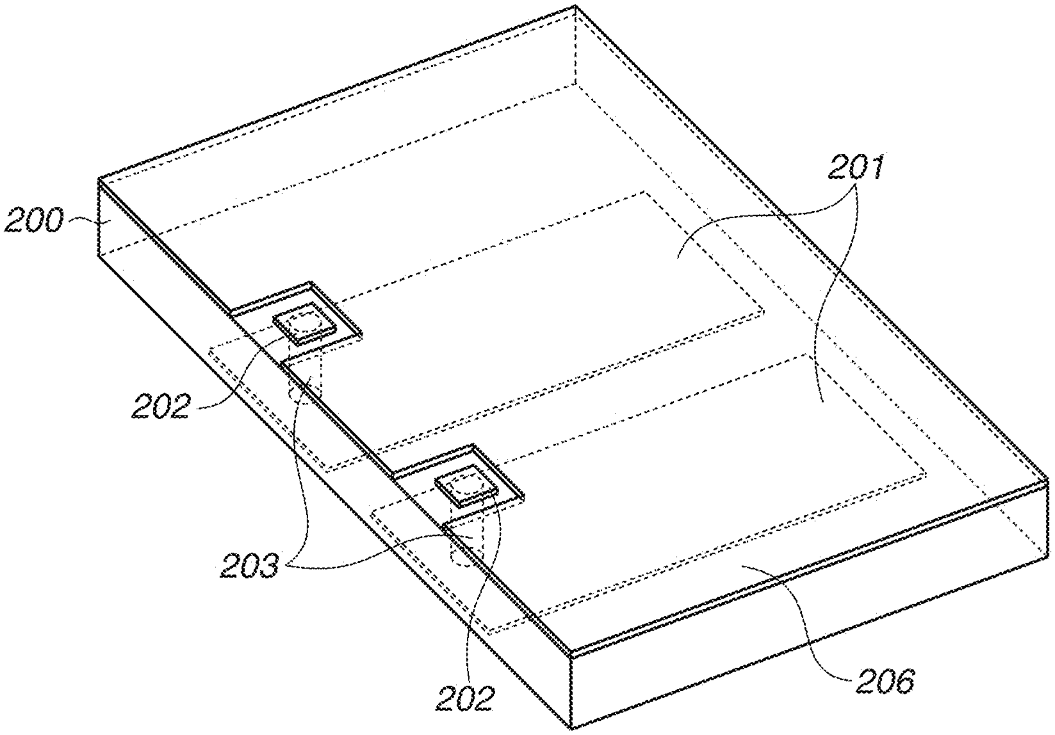
FIG. 2 is a schematic view of an electric substrate to be inserted between a flexible printed circuit and a metal member.

FIG. 2 is a schematic view of the substrate 200. FIG. 2 is a drawing viewed from a surface where the extraction electrode 202 and the ground conductor 206 are formed. The substrate 200 is provided with the differential signal lines 201 that are to be connected to the differential signal lines 101 on the above-described flexible printed circuit 107 and the ground conductor 206 that is in contact with and electrically connected to the ground surface of the metal member 106. A differential microstrip line is also formed on the substrate 200 by the differential signal lines 201 and the ground of the ground conductor 206.

The differential signal lines 101 on the flexible printed circuit 107 and the differential signal lines 201 on the substrate 200 are configured with flat conductors and are connected by soldering or a conductive adhesive. The ground conductor 206 that serves as the reference potential for the differential signal lines 201 is connected to the metal member 106 by pressure bonding with a screw or the like (not illustrated), an anisotropic conductive film (ACF), a conductive adhesive, or the like.

In a case where a differential characteristic impedance of the differential signal lines 101 on the flexible printed circuit 107 is 100Ω and a center-to-center distance between the differential signal lines 101 is 4 mm, a line width of the differential signal lines 101 is 3.58 mm, and a line spacing therebetween is 0.42 mm.

Figure 3:
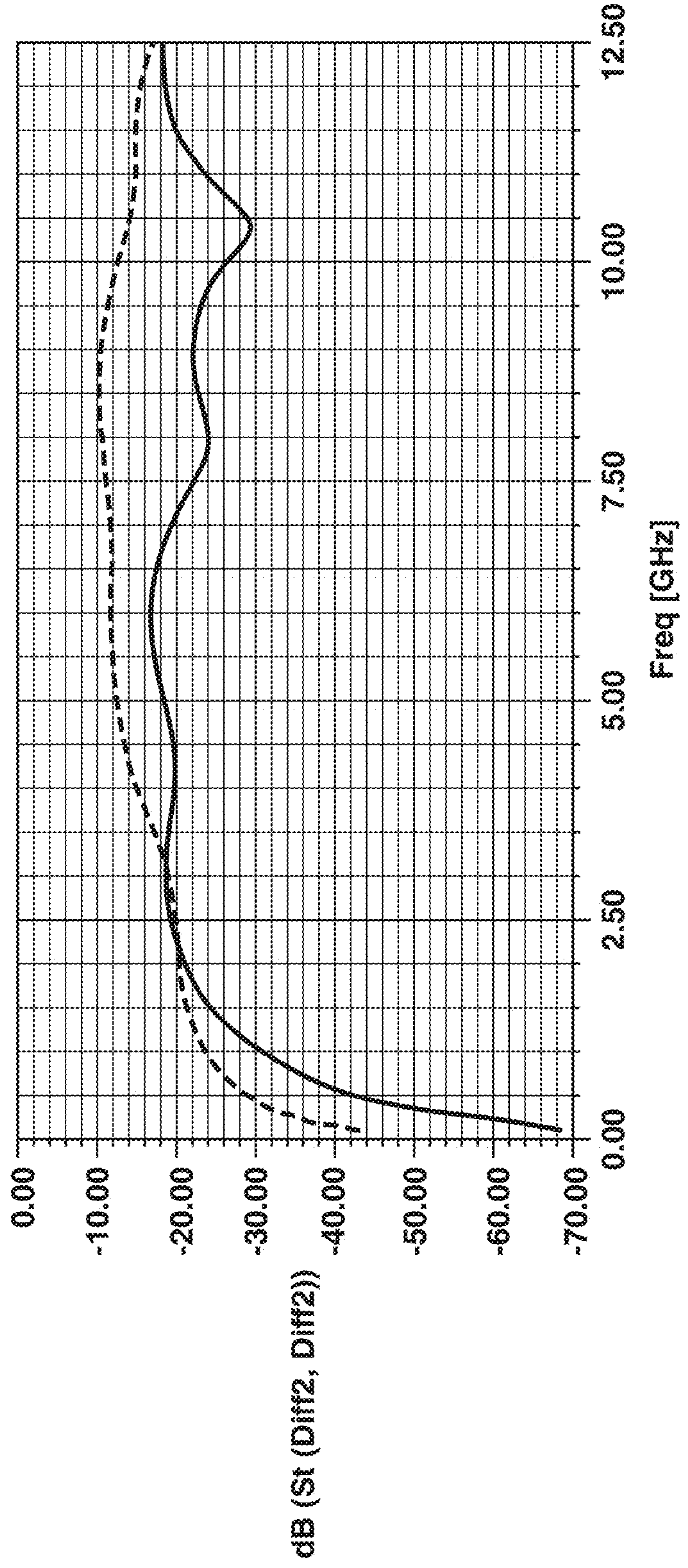
FIG. 3 illustrates reflection characteristics in a case where a substrate with a substrate inserted at a power supply portion or a termination portion of a differential transmission line, where the material of the substrate is fluorine resin.

Initially, a case where the substrate 200 is a fluorine resin substrate with a thickness of 1.6 mm will be described. In a case where a center-to-center distance between the differential signal lines 201 is equated with that of the differential signal lines 101 on the flexible printed circuit 107, a line width of the differential signal lines 201 is 2.83 mm, and a line spacing therebetween is 1.17 mm. At this time, the differential characteristic impedance becomes 100Ω, and impedance matching can be achieved. FIG. 3 illustrates reflection characteristics with the substrate 200 inserted at the termination portion of the differential transmission line in FIGS. 1A and 1B, where the material of the substrate 200 is fluorine resin. A solid line indicates the reflection characteristic in a case where the line width and the line spacing of the differential signal lines 201 are set so that a characteristic impedance of the substrate 200 matches a characteristic impedance of the flexible printed circuit 107 (line width: 2.83 mm, line spacing: 1.17 mm). On the other hand, a dotted line indicates the reflection characteristic in a case where the line width and the line spacing of the differential signal lines 201 on the substrate 200 are set to the line width and the line spacing of the differential signal lines 101 on the flexible printed circuit 107 (line width: 3.58 mm, line spacing: 0.42 mm). It can be seen that the solid line indicates better reflection characteristic in almost all frequency bands than the dotted line. Thus, matching the characteristic impedance of the fluorine resin substrate with the characteristic impedance of the flexible printed circuit reduces a mismatch.

Figure 4A:
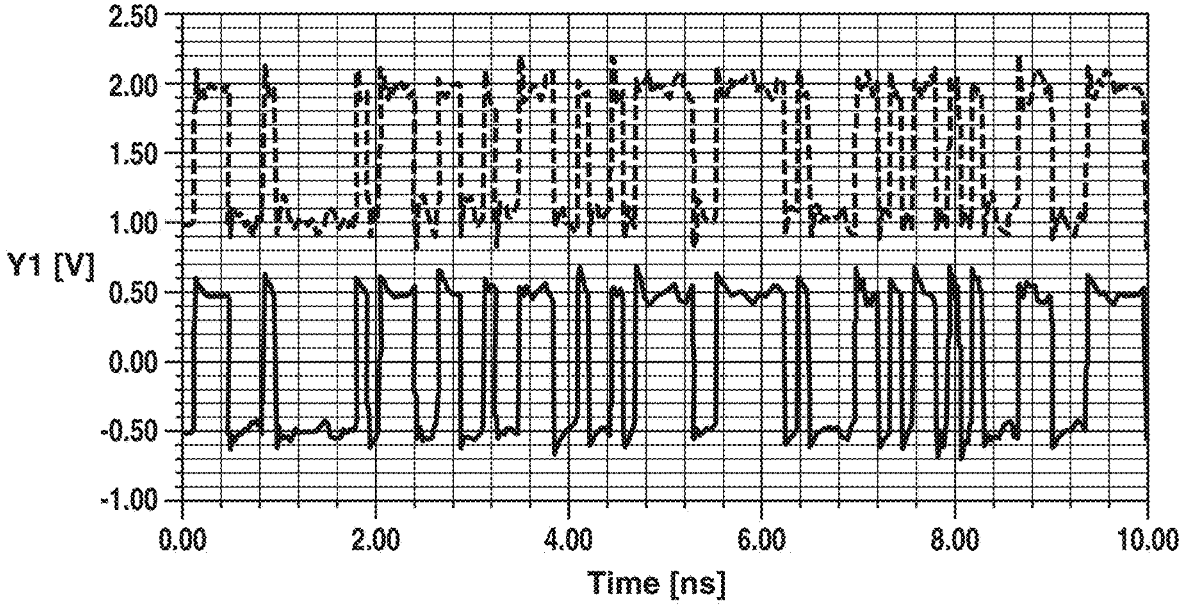
FIGS. 4A and 4B illustrate time waveforms at the power supply portion and the termination portion, respectively, with the substrate inserted at the power supply portion and the termination portion of the differential transmission line, where the material of the substrate is fluorine resin.
Figure 4B:
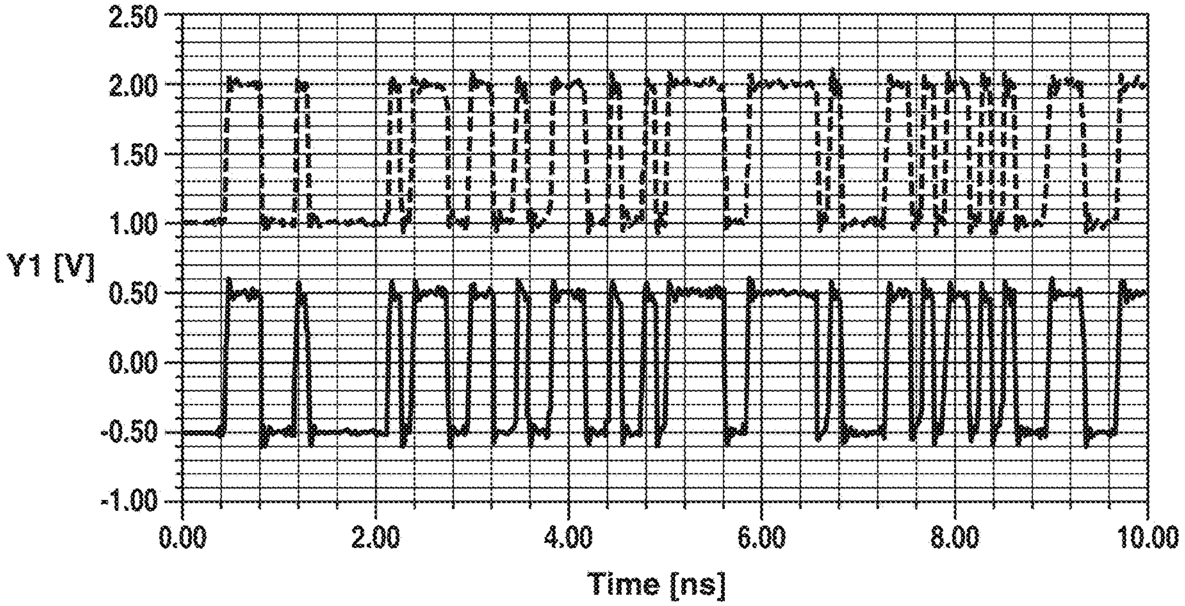

FIGS. 4A and 4B illustrate time waveforms at the power supply portion and the termination portion, respectively, with the fluorine resin substrate 200 inserted at the power supply portion and the termination portion of the differential transmission line in FIGS. 1A and 1B in a case where a 10 Gbps signal is input via the extraction electrode 202 of the above-described substrate 200. The structure of the substrate 200 in each of FIGS. 4A and 4B is the same. FIGS. 4A and 4B respectively illustrate the waveforms at the power supply portion and at the termination portion of the extraction electrode 202. A solid line indicates a case where the line width and the line spacing of the differential signal lines 201 are set such that the characteristic impedance of the substrate 200 matches the characteristic impedance of the flexible printed circuit 107. A dotted line indicates the characteristic in a case where the line width and the line spacing of the differential signal lines 201 on the substrate 200 are set to the line width and the line spacing of the differential signal lines 101 on the flexible printed circuit 107. In a case where the line width and the line spacing of the differential signal lines 201 are matched with the characteristic impedance of the flexible printed circuit 107, a waveform disturbance due to reflection is extremely small, in particular, at an input portion. Even in a case where the line width and the line spacing of the differential signal lines 201 are matched with the line width and the line spacing of the differential signal lines 101, there is some waveform disturbance at the input portion, but the waveform disturbance is small.

Figure 5:
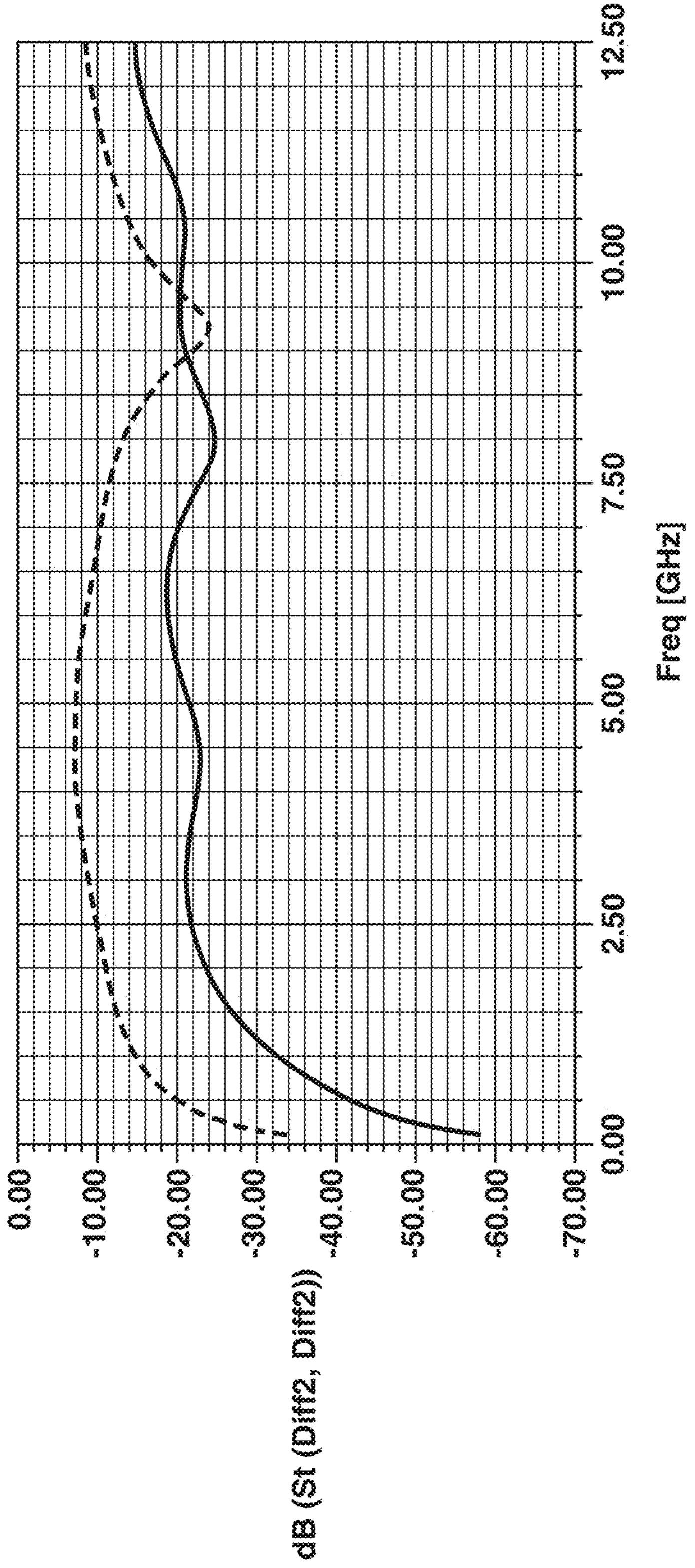
FIG. 5 illustrates reflection characteristics with a substrate inserted at the power supply portion and the termination portion of the differential transmission line, where the material of the substrate is a Flame Retardant Type 4 (FR-4) glass-reinforced epoxy laminate material.

Next, a case where the substrate 200 is a Flame Retardant Type 4 (FR-4) glass-reinforced epoxy laminate substrate with a thickness of 1.6 mm will be described. In a case where the center-to-center distance between the differential signal lines 201 is equated with that of the differential signal lines 101 on the flexible printed circuit 107, the line width of the differential signal lines 201 is 2.02 mm and the line spacing therebetween is 1.98 mm, which means that the line width is narrower and the line spacing is wider than those of the fluorine resin substrate. FIG. 5 illustrates reflection characteristics with the substrate 200 inserted at the termination portion of the differential transmission line, where the material of the substrate is FR-4. In FIG. 5, a solid line indicates the reflection characteristic in a case where the line width and the line spacing of the differential signal lines 201 are set so that the characteristic impedance of the substrate 200 matches the characteristic impedance of the flexible printed circuit 107 (line width: 2.02 mm, line spacing: 1.98 mm). A dotted line indicates the reflection characteristic in a case where the line width and the line spacing of the differential signal lines 201 on the substrate 200 are set to the line width and the line spacing of the differential signal lines 101 on the flexible printed circuit 107 (line width: 3.58 mm, line spacing: 0.42 mm).

Figure 6A:
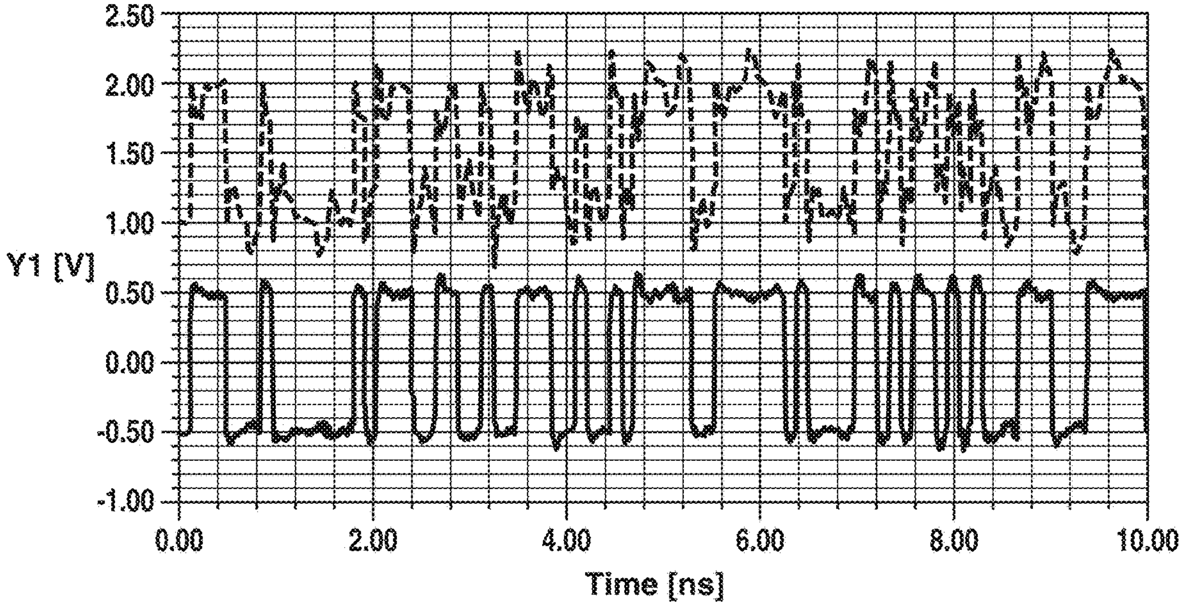
FIGS. 6A and 6B illustrate time waveforms at the power supply portion and the termination portion, respectively, with the substrate inserted at the power supply portion and the termination portion of the differential transmission line, where the material of the substrate is FR-4.
Figure 6B:
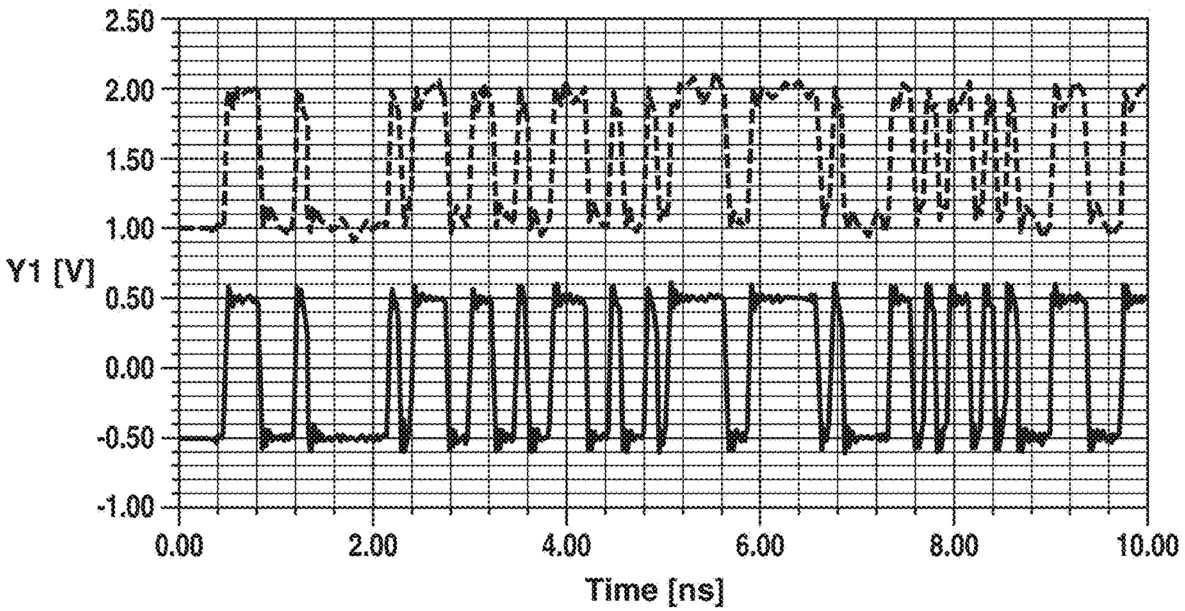

FIGS. 6A and 6B illustrate time waveforms at the power supply portion and the termination portion with the substrate 200 inserted at the power supply portion and the termination portion of the differential transmission line in FIGS. 1A and 1B in a case where a 10 Gbps signal is supplied via the extraction electrode 202 of the above-described substrate 200. The material of the substrate 200 is FR-4. FIGS. 6A and 6B respectively illustrate the waveforms at the power supply portion and at the termination portion of the extraction electrode 202. A solid line indicates a case where the line width and the line spacing of the differential signal lines 201 are set such that the characteristic impedance of the substrate 200 matches the characteristic impedance of the flexible printed circuit 107. A dotted line indicates the characteristic in a case where the line width and the line spacing of the differential signal lines 201 on the substrate 200 are set to the line width and the line spacing of the differential signal lines 101 on the flexible printed circuit 107. In a case where the line width and the line spacing of the differential signal lines 201 are set so that the characteristic impedance matches that of the flexible printed circuit 107, a waveform disturbance due to reflection is extremely small. On the other hand, in a case where the line width and the line spacing of the differential signal lines 201 are set to the line width and the line spacing of the differential signal lines 101, a waveform disturbance is large.

As can be seen from the results in FIGS. 3 to 6A and 6B, if the substrate 200 made of the fluorine resin substrate and the substrate 200 made of the FR-4 substrate are compared, it can be seen that the fluorine resin substrate has better characteristics. This is because a relative permittivity of fluorine resin is approximately 2.2, while a relative permittivity of FR-4 is approximately 4.4, so that values close to those of the flexible printed circuit are obtained. Thus, it is possible to make impedance mismatch less likely to occur.

Figure 7:
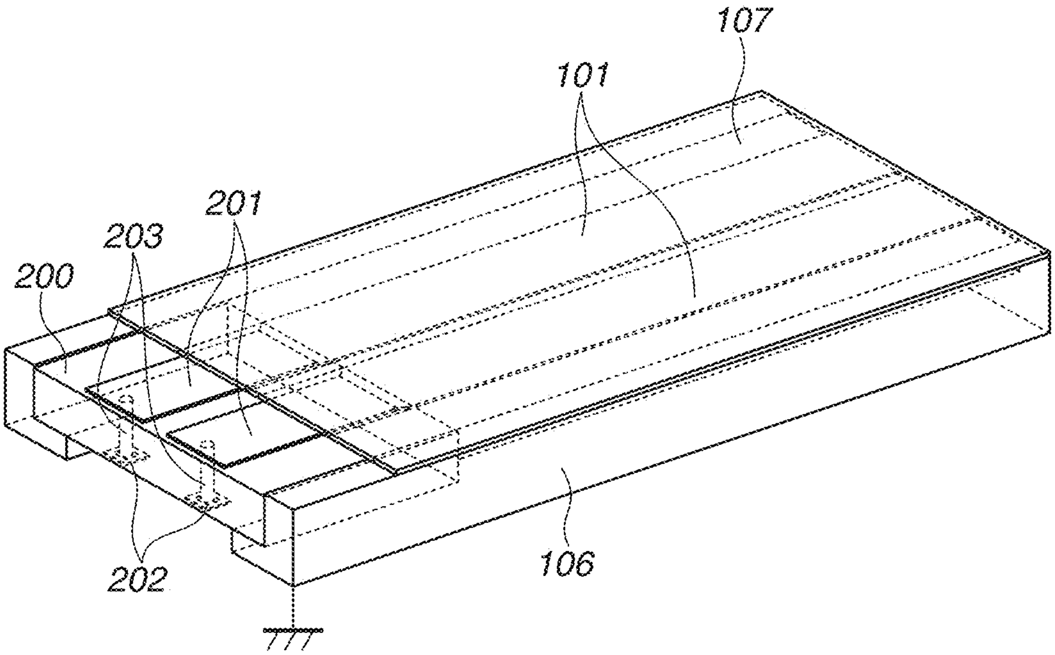
FIG. 7 is a configuration diagram illustrating another differential transmission line according to an exemplary embodiment of the present exemplary embodiment.

FIGS. 3 to 6A and 6B illustrate characteristics with the substrate 200 having the substrate thickness in correspondence to a distance of 1.6 mm inserted between the flexible printed circuit 107 and the metal member 106. The thickness of the substrate 200 does not necessarily need to match the distance between the flexible printed circuit 107 and the metal member 106, and a combination in which the thickness of the substrate 200 and the distance between the flexible printed circuit 107 and the metal member 106 are different as illustrated in FIG. 7 may be used.

Figure 8:
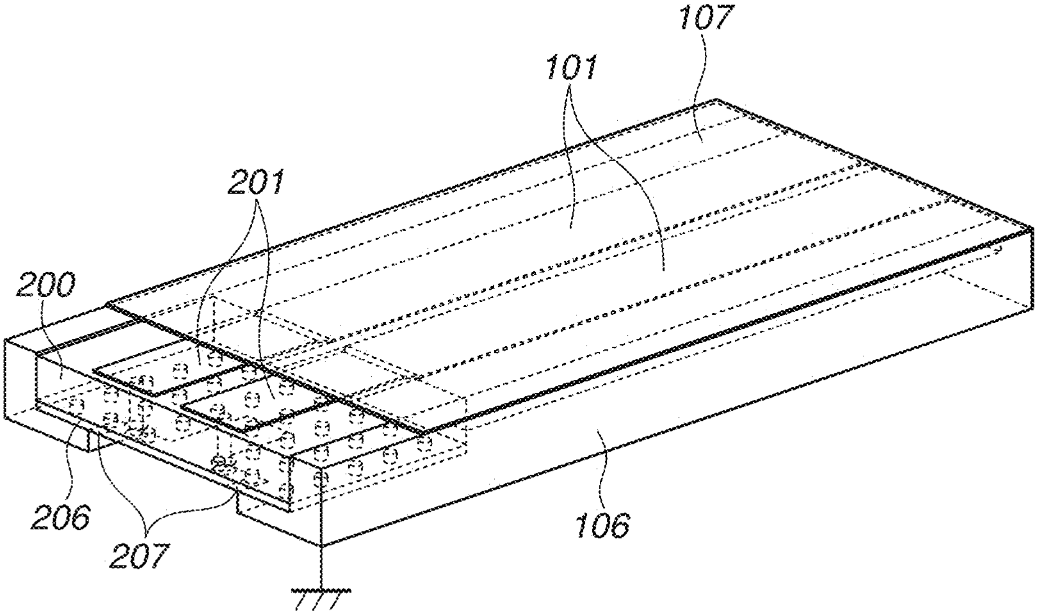
FIG. 8 is a configuration diagram illustrating yet another differential transmission line according to an exemplary embodiment of the present exemplary embodiment.

Further, as illustrated in FIG. 8, the substrate 200 may be a multi-layer substrate, and a metal portion 207 in contact with the metal member 106 and the ground conductor 206, which serves as the ground surface for the differential signal lines 201 on the substrate 200, may be in different layers. It is desirable that the metal portion 207 in contact with the metal member 106 and the ground conductor 206 are connected with as low impedance as possible using a plurality of vias or the like disposed within the substrate.

In the substrate 200, a material between the above-described ground conductor 206 and the metal portion 207 and a material between the differential signal lines 201 and the ground conductor 206 may be different, or may be a material made by bonding a dielectric material and FR-4 or the like. In particular, if the material between the differential signal lines 201 and the ground conductor 206 is a dielectric material with a low permittivity, the line width and the line spacing of the differential signal lines 101 become close in a portion not including the substrate 200 and in a portion including the substrate 200, and loss due to reflection can be reduced.

MODIFICATION

Figure 9:
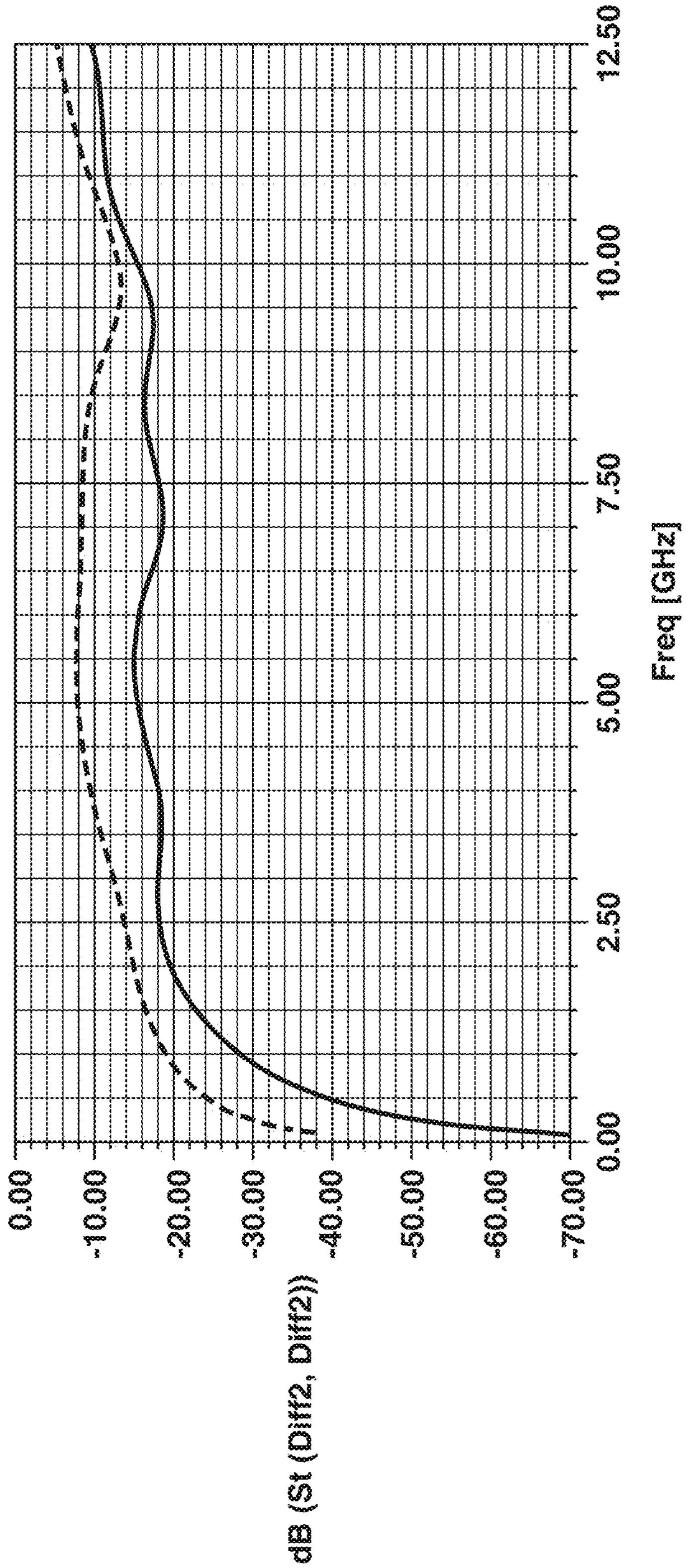
FIG. 9 illustrates reflection characteristics with a substrate inserted at the power supply portion and the termination portion of the differential transmission line, where the material of the substrate is FR-4 and has a substrate thickness of 3.0 mm.

Next, a configuration with an increased substrate thickness is described. FIG. 9 illustrates reflection characteristics in a case where the FR-4 substrate 200 with the substrate thickness of 3.0 mm inserted at the power supply portion and the termination portion of the differential transmission line in FIGS. 1A and 1B. In FIG. 9, a solid line indicates the reflection characteristic in a case where the line width and the line spacing of the differential signal lines 201 are set to match the characteristic impedance of the substrate 200 to the characteristic impedance of the flexible printed circuit 107 (line width: 2.63 mm, line spacing: 1.37 mm). On the other hand, a dotted line indicates the reflection characteristic in a case where the line width and the line spacing of the differential signal lines 201 on the substrate 200 are set to the line width and the line spacing of the differential signal lines 101 on the flexible printed circuit 107 (line width: 3.58 mm, line spacing: 0.42 mm). It can be seen that the solid line indicates better reflection characteristic in almost all frequency bands than the dotted line. Therefore, in this case as well, mismatch can be reduced by matching the characteristic impedance of the substrate to the characteristic impedance of the flexible printed circuit.

Figure 10A:
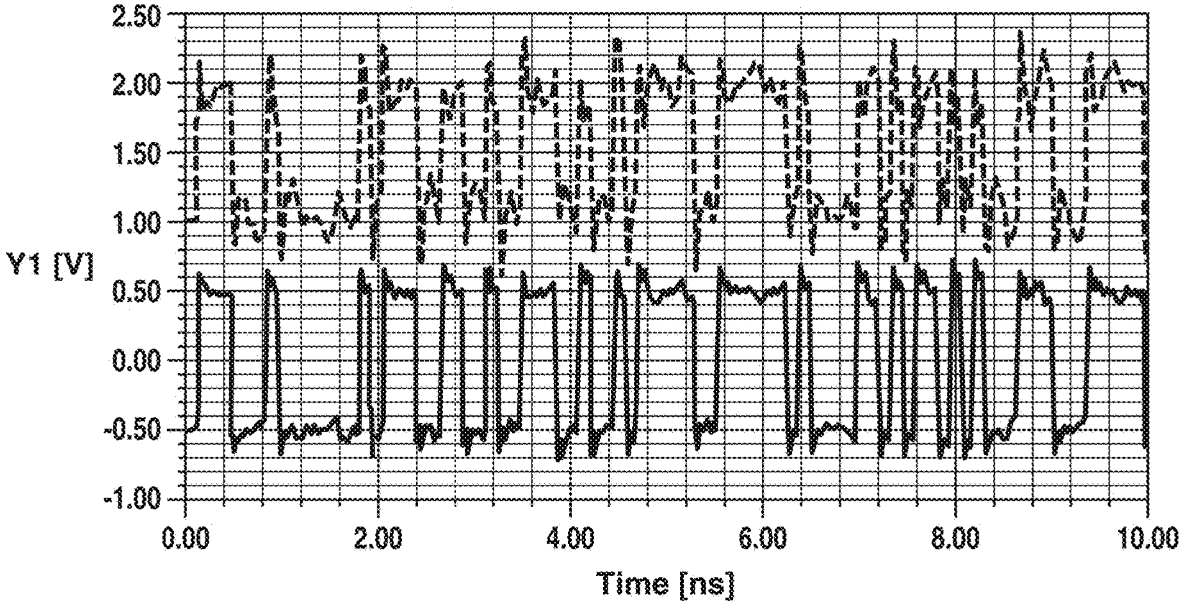
FIGS. 10A and 10B illustrate time waveforms at the power supply portion and the termination portion, respectively, with the substrate inserted at the power supply portion and the termination portion of the differential transmission line, where the material of the substrate is FR-4 and has the substrate thickness of 3.0 mm.
Figure 10B:
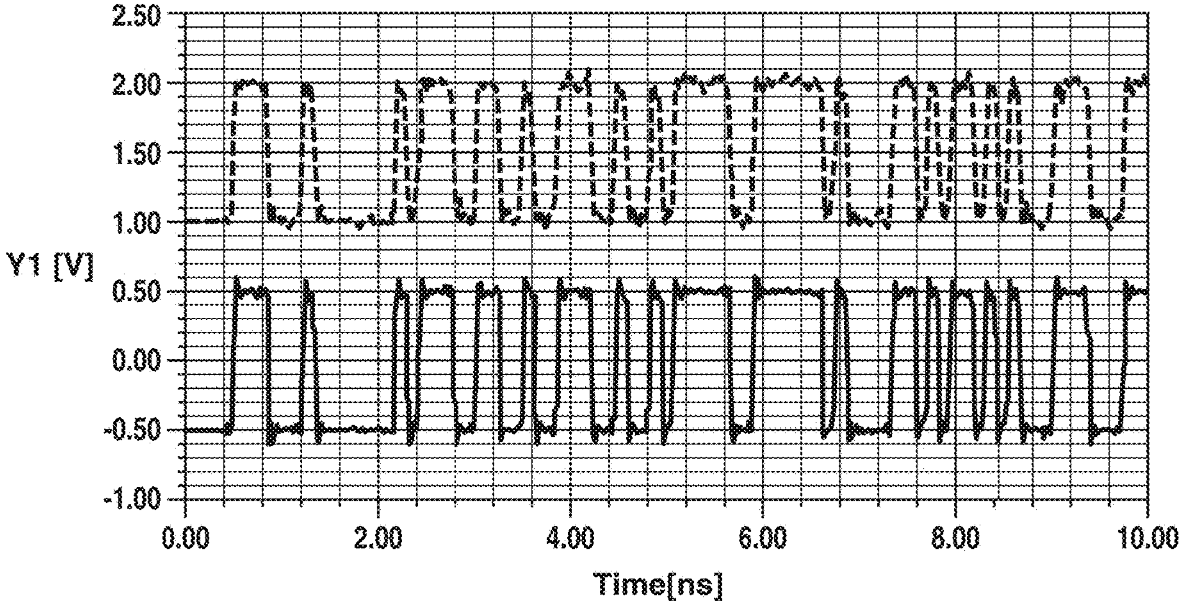

FIGS. 10A and 10B illustrate time waveforms at the power supply portion and the termination portion in a case where a 10 Gbps signal is supplied via the extraction electrode 202 of the above-described substrate 200 to terminate a similar electric substrate. In FIGS. 10A and 10B, a solid line indicates a case where the line width and the line spacing of the differential signal lines 201 are set so that the characteristic impedance of the substrate 200 matches the characteristic impedance of the flexible printed circuit 107. A dotted line indicates the characteristic in a case where the line width and the line spacing of the differential signal lines 201 on the substrate 200 are set to match the line width and the line spacing of the differential signal lines 101 on the flexible printed circuit 107. Even with the substrate thickness of 3.0 mm, if the characteristic impedance of the differential signal lines 201 is made to match that of the flexible printed circuit 107, the waveform disturbance due to reflection is extremely small, and the waveform disturbance can be reduced. On the other hand, if the line width and the line spacing of the differential signal lines 201 are made to match the line width and the line spacing of the differential signal lines 101, it can be seen that the waveform is disturbed and reflection occurs.

In a transmission line that includes a substrate with differential signal lines and has a metal surface of a member or the like serving as a reference potential, provision of an electric substrate between the substrate with differential signal lines and the metal surface as described above enables either or both of a power supply portion and a termination portion that are stable and with little reflection. The above-described substrate material, substrate thickness, signal line width, line spacing, and the like are specified for the purpose of description and are not limited thereto. The above-described electric substrate also includes the one in which a metal pattern is drawn on a dielectric material, and in this case, a connection portion connecting a differential signal line 201 and an extraction electrode 202 is not limited to a via, and a material and a shape are not particularly limited as long as it is a conductive material passed through a hole in a dielectric material. The extraction electrode only needs to be connected to a connection portion such as a via, and may also be used as a pattern to be connected directly to an electrical circuit component or a foot pattern for a cable connector and other components.

In a case of the FR-4 substrate with the substrate thickness of 3.0 mm, the line width is 2.63 mm, so that the line width can be increased compared with the line width of 2.02 mm in a case of the substrate thickness of 1.6 mm. Accordingly, it is possible to strengthen electromagnetic field coupling with a facing coupler and improve a signal level, which will be described in the next chapter.

<Configuration of Wireless Communication System>

Figure 11A:
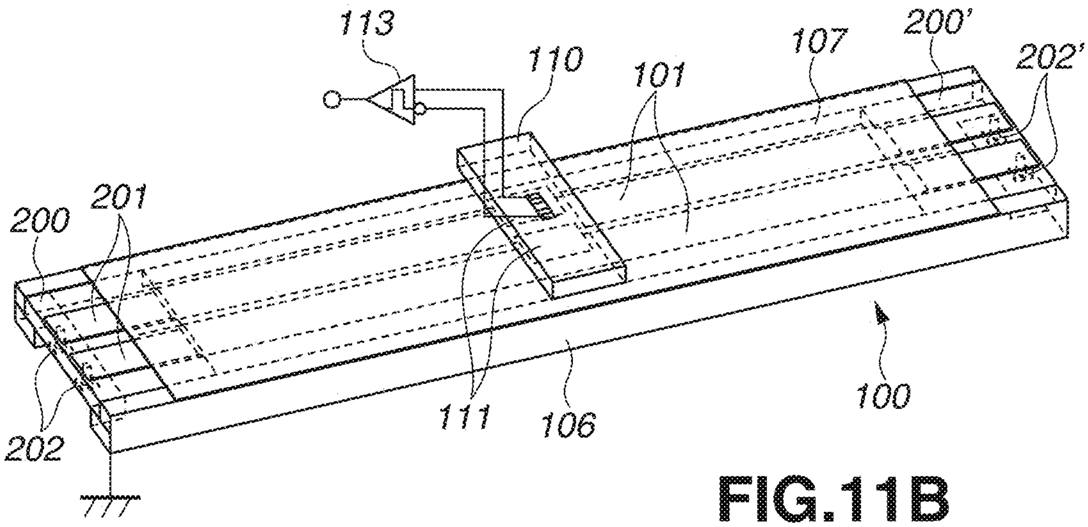
FIGS. 11A to 11D are configuration diagrams illustrating a wireless communication system according to an exemplary embodiment of the present exemplary embodiment.

FIG. 11A illustrates a configuration example of a wireless communication system using a transmission line. In FIG. 11A, a first transmission line similar to that in FIGS. 1A and 1B, with a first coupler 100 and a second coupler 110 facing each other to transmit data through electromagnetic field coupling. The second coupler 110 is spaced from the first coupler 100 by a predetermined range distance, and moves in a longitudinal direction of the first coupler 100 with the predetermined range distance maintained. The second coupler 110 is arranged so that at least a part of the second coupler 110 overlaps the first coupler 100 when viewed from a vertical direction. Further, a length of the second coupler 110 is shorter than that of the first coupler 100. The second coupler 110 includes at least differential signal lines 111.

Figure 11B:
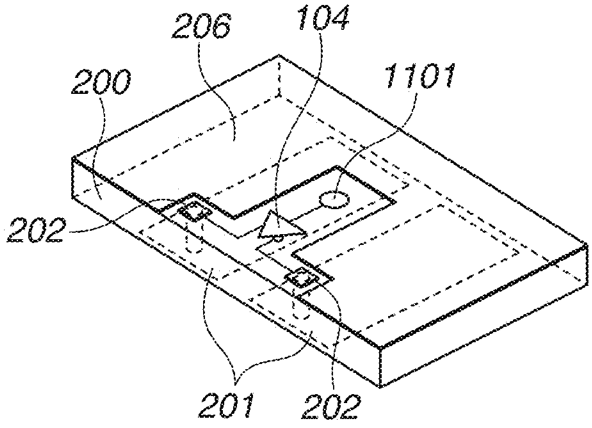
Figure 11C:
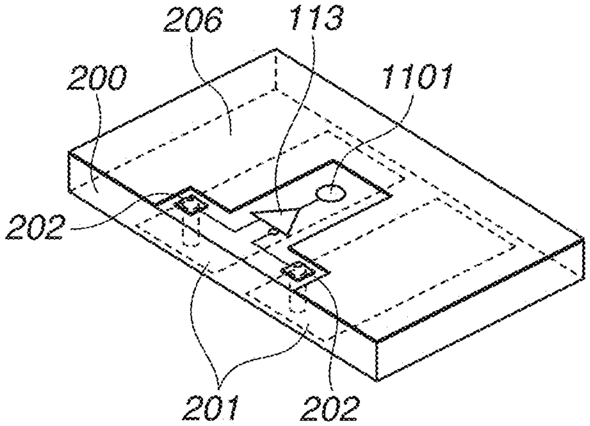

FIG. 11B is a simplified diagram illustrating the substrate 200 in a case where the first coupler 100 operates as a transmission coupler and inputs signals. FIG. 11B illustrates a high frequency connector 1101 and a transmission buffer 104 including a high frequency amplifier capable of outputting differential signals. FIG. 11C is a simplified diagram illustrating the substrate 200 in a case where the first coupler 100 operates as a reception coupler and outputs a signal. FIG. 11C illustrates a high frequency amplifier 113 capable of inputting differential signals, which is alternatively a comparator 113 with hysteresis. For the substrate with a high frequency circuit mounted thereon as illustrated in FIG. 11C, it is easy to equate the lengths of differential signal patterns, and skew between differential signals can be made extremely small.

Figure 11D:
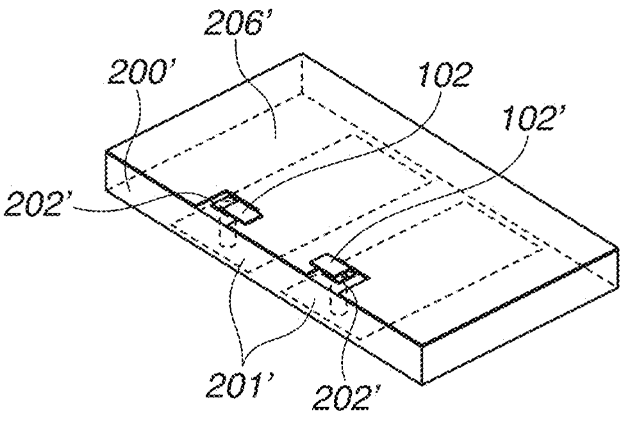

FIG. 11D illustrates termination of extraction electrodes 202' of a substrate 200'. In FIG. 11D, the extraction electrodes 202' connected to the differential signal lines 201 are individually terminated to a metal 206' serving as a ground at termination resistors 102 and 102'. A portion between the extraction electrodes 202' may be terminated using a differential characteristic impedance without going through the ground. In such a case, the extraction electrodes 202' may be terminated on the flexible printed circuit 107 without insertion of the substrate 200'.

For the substrate 200 including multiple layers as illustrated in FIG. 8, it is possible to insert a ground layer between a first surface layer on which the differential signal lines 201 are printed and a second surface layer on which a high frequency circuit unit for inputting and outputting a high frequency signal is mounted. The ground layer serves as a common reference potential for the differential signal lines 201 and the high frequency circuit unit. Since a distance between the high frequency circuit and the differential signal lines is short and the high frequency circuit and the differential signal lines are fixed, a high frequency signal is extremely stabilized when being input to and output from the differential signal lines 201 and the differential signal lines 101 connected to the differential signal lines 201.

The differential signal lines 111 may be in a form of an inductive coupler in which both the differential signal lines are directly or indirectly connected and that detects a variation in current occurring between the differential signal lines 111. Alternatively, the differential signal lines 111 may be in a form of a capacitive coupler in which both the differential signal lines are separated and that detects a voltage difference between the differential signal lines.

A metal serving as a reference potential may be arranged on a substrate surface on an opposite side of the differential signal lines 111. In such a case, the differential signal lines 111 may be in a form of a microstrip line directional coupler that is shorted at one end and detects a signal from the other end. As a type of a directional coupler, the differential signal lines 111 may be in a form of a coplanar line that has a ground potential on both sides of the same surface of the differential signal lines 111. The extraction electrodes 202 are connected to the above-described second transmission line 110 to input and output a differential signal.

While case where a high frequency circuit substrate is mounted on the electric substrate 200 has been described in conjunction with FIGS. 11A to 11C as examples, a cable may be connected to the extraction electrode 202 and signal processing may be performed on a separate substrate.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-079712, filed May 12, 2023, which is hereby incorporated by reference herein in its entirety.

What is claimed is:

1. A communication apparatus that communicates with another communication apparatus through electromagnetic field coupling, the communication apparatus comprising:

a first conductor configured to transmit or receive a signal through the electromagnetic field coupling;

a metal member configured to function as a ground of the first conductor;

a second conductor connected to the first conductor;

an extraction electrode; and a circuit, the circuit being a transmission circuit or a reception circuit;

wherein the first conductor has one side connected to the second conductor and another side connected to the circuit being the transmission circuit or the reception circuit, wherein a first surface of the extraction electrode is connected to the second conductor, and wherein a second surface of the extraction electrode is terminated to the metal member via a termination resistor.

2. The communication apparatus according to claim 1, wherein the first conductor and the second conductor are flat, and wherein the first conductor is connected to the second conductor on a surface different from a surface on which the signal is transmitted or received through the electromagnetic field coupling.

3. The communication apparatus according to claim 1, wherein the first conductor includes first differential signal lines, wherein the second conductor includes second differential signal lines, and wherein a center-to-center distance between the first differential signal lines and a center-to-center distance between the second differential signal lines are substantially the same.

4. The communication apparatus according to claim 1, wherein the first conductor is disposed on a first substrate.

5. The communication apparatus according to claim 4, wherein the first substrate is a flexible printed circuit.

6. The communication apparatus according to claim 4, wherein the second conductor and a third conductor are disposed on a second substrate, and wherein the extraction electrode connects to the second conductor through a via to input and output a differential signal.

7. The communication apparatus according to claim 6, wherein the second conductor and the third conductor are disposed on different layers of the second substrate.

8. The communication apparatus according to claim 7, wherein the second substrate is made of a dielectric material.

9. The communication apparatus according to claim 8, wherein the dielectric material is fluorine resin.

10. The communication apparatus according to claim 9, wherein the third conductor on the second substrate is connected to the metal member via a screw or a conductive adhesive.

11. A wireless communication system comprising:

a transmission or reception apparatus that includes:

a first conductor;

a metal member configured to function as a ground of the first conductor;

a second conductor connected to the first conductor;

an extraction electrode connected to the second conductor and terminated to the metal member; and a circuit, the circuit being a transmission circuit or a reception circuit, wherein the first conductor has one side connected to the second conductor and another side connected to the circuit being the transmission circuit or the reception circuit, and another transmission or reception apparatus that includes another conductor spaced from the first conductor and electromagnetically coupled to the first conductor.

12. The wireless communication system according to claim 11, wherein the extraction electrode connects to the second conductor through a via to input and output a differential signal.

* * * * *